United States Patent
Luo et al.

(10) Patent No.: US 7,535,938 B2
(45) Date of Patent: May 19, 2009

(54) LOW-NOISE MONOLITHIC MICROCHIP LASERS CAPABLE OF PRODUCING WAVELENGTHS RANGING FROM IR TO UV BASED ON EFFICIENT AND COST-EFFECTIVE FREQUENCY CONVERSION

(75) Inventors: Ningyi Luo, Fremont, CA (US); Sheng-Bai Zhu, Fremont, CA (US)

(73) Assignee: Pavilion Integration Corporation, San Jose, CA (US)

( * ) Notice: Subject to any disclaimer, the term of this patent is extended or adjusted under 35 U.S.C. 154(b) by 216 days.

(21) Appl. No.: 11/464,424

(22) Filed: Aug. 14, 2006

(65) Prior Publication Data

US 2007/0047600 A1    Mar. 1, 2007

Related U.S. Application Data

(60) Provisional application No. 60/708,596, filed on Aug. 15, 2005.

(51) Int. Cl.
*H01S 3/10* (2006.01)
(52) U.S. Cl. .................. 372/21; 372/22; 372/23
(58) Field of Classification Search .................. 372/21, 372/22
See application file for complete search history.

(56) References Cited

U.S. PATENT DOCUMENTS

| | | | |
|---|---|---|---|
| 5,388,114 A | 2/1995 | Zarrabi et al. | |
| 5,832,010 A | 11/1998 | Fulbert et al. | |
| 5,835,513 A | 11/1998 | Pieterse et al. | |
| 5,909,306 A | 6/1999 | Goldberg et al. | |
| 5,912,912 A | 6/1999 | Caprara et al. | |
| 5,943,351 A | 8/1999 | Zhou et al. | |
| 6,005,878 A | 12/1999 | Kung et al. | |
| 6,031,854 A | 2/2000 | Ming | |
| 6,088,379 A | 7/2000 | Owa et al. | |
| 6,111,900 A | 8/2000 | Suzudo | |
| 6,198,756 B1 | 3/2001 | Caprara et al. | |
| 6,347,102 B1 | 2/2002 | Konno et al. | |
| 6,362,919 B1 * | 3/2002 | Flanders ................ | 359/497 |
| 6,373,868 B1 | 4/2002 | Zhang | |
| 6,490,309 B1 | 12/2002 | Okazaki et al. | |
| 6,498,801 B1 | 12/2002 | Dudelzak et al. | |
| 6,526,073 B1 | 2/2003 | Spinelli et al. | |
| 6,553,052 B1 | 4/2003 | Ireland | |
| 6,614,584 B1 * | 9/2003 | Govorkov et al. ......... | 359/328 |
| 6,700,906 B2 | 3/2004 | Hackel et al. | |
| 6,701,044 B2 | 3/2004 | Arbore et al. | |

(Continued)

*Primary Examiner*—Minsun Harvey
*Assistant Examiner*—Michael Carter

(57) ABSTRACT

A method for producing low-noise laser output at wavelengths ranging from IR through visible to UV in various operation modes from a monolithic microchip laser comprises schemes of (1) generating one or two fundamental beam(s) from light source(s) selected upon the desired wavelength(s), polarization(s), and other features related to the desired laser output; (2) intracavity beam combination/separation due to the walk-off effect in one or more birefringent crystal(s) transparent to the propagating lights and highly anisotropic; (3) wavelength conversion in one or more nonlinear optical crystal(s); (4) compact and efficient pump source(s); and (5) minimization of intracavity loss/noise. One resonator cavity supports only one fundamental beam, which eliminates the green problem. The gain media can be selected from an extensive group of materials including isotropic and naturally birefringent crystals, with polarization dependent or independent laser emissions. Laser devices constructed in accordance with the inventive method are demonstrated with various configurations.

5 Claims, 15 Drawing Sheets

U.S. PATENT DOCUMENTS

| | | |
|---|---|---|
| 6,741,620 B2 | 5/2004 | Gerstenberger et al. |
| 6,765,201 B2 | 7/2004 | Uto et al. |
| 6,806,440 B2 | 10/2004 | Sun et al. |
| 6,816,519 B2 * | 11/2004 | Momiuchi et al. ............ 372/21 |
| 6,873,639 B2 | 3/2005 | Zhang |
| 6,898,216 B1 | 5/2005 | Kleinschmidt |
| 2005/0128473 A1 | 6/2005 | Karpol et al. |
| 2005/0169326 A1 | 8/2005 | Jacob et al. |
| 2005/0201442 A1 | 9/2005 | Luo et al. |
| 2006/0045161 A1 | 3/2006 | Kadoya |

* cited by examiner

LOW-NOISE MONOLITHIC MICROCHIP LASERS CAPABLE OF PRODUCING WAVELENGTHS RANGING FROM IR TO UV BASED ON EFFICIENT AND COST-EFFECTIVE FREQUENCY CONVERSION

CROSS REFERENCE TO RELATED APPLICATION

This application claims the benefit of U.S. Provisional Application No. 60/708,596, filed Aug. 15, 2005, which is hereby incorporated by reference in its entirety.

FIELD OF THE INVENTION

This invention relates generally to solid-state lasers, and in particular to monolithic microchip lasers using intracavity beam combining and frequency conversion to generate low noise single longitudinal mode or multiple longitudinal mode lasers at a variety of wavelengths, from IR through visible to UV.

BACKGROUND OF THE INVENTION

Invented in this patent are low-noise monolithic microchip lasers capable of producing wavelengths ranging from IR through visible to UV for a variety of applications such as eye-safe laser transmitters and LIDAR, mid-IR remote sensing, laser projection display systems, material processing, micro-machining, photolithography, defect inspection, optical information processing and communication, spectroscopic detection of trace gases, diagnostics, therapy, photorefractive surgeries, fluorometric analysis of organic cells, nanotechnology, and scientific research.

Current sources of coherent UV light are not entirely satisfactory, each has some unfortunate drawbacks. Excimer lasers can produce output beams with high average powers, but require toxic, corrosive halogen gases for operation, which necessitates gas processing, storage and circulation technologies. There lasers are bulky, complex, potentially hazardous, and expensive. Furthermore, they cannot operate at high pulse repetition rates, and their beam transverse mode is quite far from $TEM_{00}$. Ion lasers including frequency-doubled ion lasers are available at a number of wavelengths in the visible and UV region. However, they are inefficient, have high operating costs and short lifetimes. Dye lasers are impractical for large-scale industrial production since they require frequent changes of the liquid dye solution to maintain operation. Fiber lasers incorporate the active lasing dopant ions into a thin, flexible, glass matrix, and direct the output light via low-loss fiber propagation. Such systems require minimal alignment, and the output beam quality is predominantly determined by physical fiber structure. However, intracavity frequency conversion is not generally possible with fiber lasers. In addition, fiber laser systems suffer from low power level, short lifetime, low efficiency, and are very expensive.

There has been a great deal of interest in developing solid-state lasers that produce coherent UV radiation. For example, in U.S. Pat. No. 5,388,114, Zarrabi, et al. disclosed a self-Q-switched monolithic laser to produce green or UV light through intracavity Second Harmonic Generation (SHG) or Fourth Harmonic Generation (FHG). In U.S. Pat. No. 5,835,513, Pieterse, et al. described a Q-switched laser with external cavity Third Harmonic Generation (THG) for producing UV. U.S. Pat. No. 5,943,351 issued to Zhou, et al. demonstrated a laser, wherein SHG was in a main resonator and THG was in a sub-resonator. U.S. Pat. No. 6,005,878 to Kung, et al. was for multimode UV. In U.S. Pat. No. 6,031,854, Ming used a two-step pump scheme to achieve laser output at Deep Ultraviolet (DUV). Disclosed in U.S. Pat. No. 6,088,379 to Owa, et al. was an apparatus for generating laser light at 193 nm to 213 nm based on Sum Frequency Mixing (SFM) of a light having wavelength in the range from 650 nm to 1100 nm, emitted from a Ti:sapphire laser, and another light having wavelengths near 260 nm, resulted from SHG of a rare-earth ion laser. A similar system was described by Caprara, et al. in U.S. Pat. No. 6,198,756. Wavelength conversion in U.S. Pat. No. 6,347,102 to Konno, et al. was achieved through an SHG crystal and an SFM crystal placed in the resonator of fundamental wavelength. Single Longitudinal Mode (SLM) CW operation at green, blue, and UV was obtained by Zhang, as described in U.S. Pat. No. 6,373,868, by means of intracavity harmonic generations through two or three nonlinear optical crystals in series and wavelength selection elements. CW laser output at about 360 nm from an apparatus comprising a Pr-doped or co-doped gain medium and an SHG crystal was demonstrated by Okazaki, et al. in U.S. Pat. No. 6,490,309. Dudelzak, et al. in U.S. Pat. No. 6,498,801 described multi-stage production of DUV by the use of phase conjugated Stimulated Raman Scattering (SRS) and harmonic generation. In U.S. Pat. No. 6,526,073, Spinelli, et al. demonstrated a system for producing CW DUV laser through SFM, wherein the optically nonlinear crystal was positioned in a traveling wave resonator for circulation of the first wavelength radiation while the second wavelength radiation was from an intracavity frequency-doulbed argon ion laser. A system for producing green or UV output, comprising an ND:glass laser, a frequency conversion device, and a zig-zag slab amplifier, was described by Hackel, et al. in U.S. Pat. No. 6,700,906. A laser device for producing wavelength below 200 nm based on SFM of 946 nm radiation from an Nd:YAG laser and its fourth harmonic beam was disclosed by Gerstenberger, et al. in U.S. Pat. No. 6,741,620.

These solid-state laser systems are generally complicated, expensive, and low efficiency. One way to improve the frequency conversion efficiency is to focus the incident beams to small spot sizes. This approach, however, is limited by the diffraction constraints and thermal lensing issues. Another approach is resonant cavity enhancement. An annoyance in intracavity frequency conversion is the "green problem" discovered by T. Baer in 1986. Three approaches to the "green problem" have been investigated in the prior art: (1) lasers operated with a great many longitudinally modes (up to 100) to average out intensity fluctuations in time domain; (2) SLM lasers to eliminate longitudinal mode coupling; (3) lasers operated at few modes with decoupled eigenstates of polarization. All these approaches require the insertion of mode-selection elements and/or temperature stabilization or a long resonator, introducing additional complexity and cost.

It would be an advantage and, in fact, an object of the present invention as well, to provide a method and apparatus whereby wavelengths covering a broad range from IR through visible to UV can be obtained with high efficiency, low optical noise, and compact size.

SUMMARY OF THE INVENTION

It is therefore an object of the present invention to provide a method and associated apparatus and device for enabling low-noise laser output from a monolithic microchip laser based on efficient and cost-effective frequency conversion.

It is another object of the present invention to provide a method and associated apparatus and device capable of producing various wavelengths, ranging from IR through visible to UV, from a monolithic microchip laser based on efficient and cost-effective frequency conversion.

It is yet another object of the present invention to provide a number of alternative configurations, highly flexible in accordance with specific applications, for further improving the compactness and/or performance of the monolithic microchip laser based on efficient and cost-effective frequency conversion.

According to this invention, frequency conversion is based on interaction of one incoming beam with a nonlinear optical crystal for intracavity harmonic generation or optical parametric generation or interaction of two incoming beams with a nonlinear optical crystal for intracavity sum frequency mixing or difference frequency mixing. Frequency conversion can take place in one step or multiple steps (cascaded). Incoming beam(s) involved in the first-step frequency conversion are fundamental beam(s). Incoming beam(s) involved in the second-step frequency conversion and on can be a fundamental beam and/or the output beam(s) of the previous step(s). At least one fundamental beam is generated from lasing gain medium, which can be naturally birefringent or isotropic.

According to this invention, two fundamental laser beams are generated from two independent laser cavities for elimination of the green problem. These two fundamental laser beams are linearly polarized with mutually orthogonal polarizations and are combined based on the walk-off effect in a birefringent crystal to generate the desired wavelengths by means of intracavity sum frequency mixing or difference frequency mixing (DFM) in a nonlinear optical (NLO) crystal.

According to this invention and depending on specific needs, the two fundamental laser beams can be generated at the same side of the microchip laser or at the two opposite sides of the microchip laser and enter the NLO crystal from both sides. With optimized configuration, the laser compactness and/or efficiency can be further improved.

According to this invention, the fundamental laser beams can be generated from gain media characteristic of polarization dependent emission or of polarization independent emission. With this flexibility, the selectable materials and wavelengths are greatly extended.

According to this invention, one of the fundamental laser beams can be generated from laser diodes or optical parametric oscillation (OPO) or other sources that preferably emit linearly polarized lights to form monolithic or hybrid systems. Features of the specially designed fundamental beams such as wavelength coverage, RF modulation, direct modulation, and broadband spectrum can be carried into the mixed output.

According to this invention, the walk-off effect can be applied to polarization discrimination. In particular, each laser cavity supports a single polarization of predetermined direction. Inclusion of intracavity polarizers is therefore not necessary. With polarization discrimination, lasing at unwanted polarizations can be suppressed.

According to this invention, the walk-off crystal(s) are preferably transparent to the propagating lights and are highly birefringent, namely, large walk-off angle or large difference between the refractive indices of the ordinary and extraordinary beams. This allows of using thin birefringent crystals for beam combination/separation, which reduces optical loss/noise associated with beam divergence and absorption.

According to this invention, a monolithic microchip laser can be composed of one gain medium for generation of a fundamental laser beam and one or more nonlinear optical crystals for efficient and cost-effective frequency conversion (up-conversion and/or down-conversion). A birefringent crystal can be sandwiched in between the gain medium and nonlinear crystal(s) to suppress lasing at unwanted polarization. Because of the birefringent, the laser gain medium can be isotropic or anisotropic. In addition, singly resonant OPO can be realized in a simple, cost-effective, and compact structure.

According to this invention, one or more additional nonlinear processes for resonant or non-resonant harmonic generation and/or optical parametric generation and/or frequency mixing can be integrated for producing new wavelengths with high efficiency. With sophisticated selection of incoming waves and nonlinear processes, a variety of useful wavelengths, ranging from IR through visible to UV, can be generated. Selection of the incoming waves is based on their wavelengths and polarizations in accordance with specific application needs.

According to this invention, one or more optical element(s) can be attached, in physical contact or not, to one or each gain medium for specific applications. These optical elements can be wavelength selectors for SLM or tunable laser operation or gain compensators for broadband and multimode laser outputs or a set of frequency filters for laser spectra of desired bandwidth. These optical elements can also be electro-optic devices such as Pockels or Kerr cells, or acousto-optic devices or passive devices such as doped crystal characteristic of nonlinear transmission for Q-switch or mode locking.

According to this invention, crystals and optical elements are optically bonded each other to form a monolithic structure of low intracavity loss. Low-cost and high-volume fabrication is feasible.

According to this invention, low speckle noise laser images at various wavelengths can be achieved from the monolithic microchip laser through time averaging of uncorrelated speckle patterns generated from a number of independent longitudinal modes.

BRIEF DESCRIPTION OF THE DRAWINGS

This invention may be more completely understood by reading the following detailed description of various schemes and embodiments in connection with the accompanying drawings, in which.

DETAILED DESCRIPTION OF THE INVENTION

Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

Figure 1A:
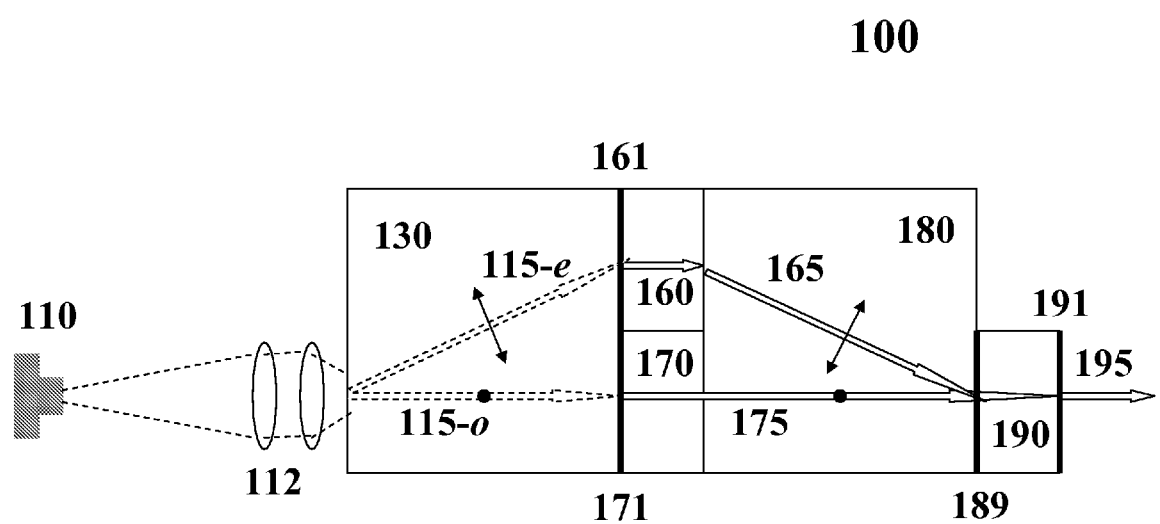
FIG. 1A shows an inventive scheme for efficient and low-noise intracavity beam combining and frequency mixing in a monolithic structure.

Referring now to the drawings and in particular to FIG. 1A, wherein a preferred embodiment for monolithic microchip laser based on inventive scheme of intracavity beam combining and frequency mixing is shown. The monolithic microchip laser 100 comprises a laser diode or other light source 110, beam shaping element 112, birefringent crystal 130, laser gain media 160 and 170, another birefringent crystal 180, and a nonlinear optical (NLO) crystal 190. These crystals are in physical contact with each other and are optically bonded.

According to our inventive teachings, the gain media 160 and 170 can be in one single crystal or in two crystals with proper orientations. These crystals can be naturally birefringent or isotropic, with polarization dependent or independent stimulated emission cross-sections. This advantage enables wide selection of gain media and, consequently, production of various wavelengths.

The laser diode 110 emits the pump light 115, which is split into two beams 115-$e$ and 115-$o$ of orthogonal polarizations in the birefringent crystal 130 due to the walk-off effect. The pump beam 115-$e$ activates the first gain medium 160 to produce stimulated emission at the first fundamental wavelength $\lambda_1$, while the pump beam 115-$o$ activates the second gain medium 170 to produce stimulated emission at the second fundamental wavelength $\lambda_2$. There are a number of alternative configurations for splitting the pump light 115 into two components. In particular, the beam splitter can be a pair of parallel mirrors coated with polarization-sensitive films and oriented 45° relative to the incident light, or a double PBS (polarized beam splitters), or one polarization-sensitive mirror combined with a PBS or a prism with appropriate coatings. Alternatively, the gain media can be pumped by two diodes, whether separated or packed together as a dual-emitter, coupled via free-space or optic fiber.

Cavity mirrors 161, 171, and 191 are dielectric coatings and are respectively formed onto the exterior surfaces of crystals 160, 170, and 190 to provide high reflectance to support resonance at the desired wavelengths, and/or high transmittance for output coupling and/or suppression of unwanted oscillation, and/or antireflection for minimizing transmission loss. The mirrors 161 and 191 form the first resonant cavity to generate the laser beam 165. The second resonant cavity, which generates the laser beam 175, is composed of the mirrors 171 and 191. Owing to the walk-off in the birefringent crystal 180, the laser beams 165 and 175 are formed in separate cavities, which eliminates the "green problem", and are combined in the nonlinear optical crystal 190 with type II phase matching to produce a new laser beam 195 with either the reduced wavelength $\lambda_m = \lambda_1 \lambda_2 / (\lambda_1 + \lambda_2)$ for SFM or increased wavelength $\lambda_d = \lambda_1 \lambda_2 / |\lambda_1 - \lambda_2|$ for DFM. The interface 189 between the birefringent crystal 180 and the nonlinear optical crystal 190 is coated HT (highly-transmissive) or AR (anti-reflective) to both $\lambda_1$ and $\lambda_2$, while HR (highly-reflective) to $\lambda_m$ or $\lambda_d$.

Figure 1B:
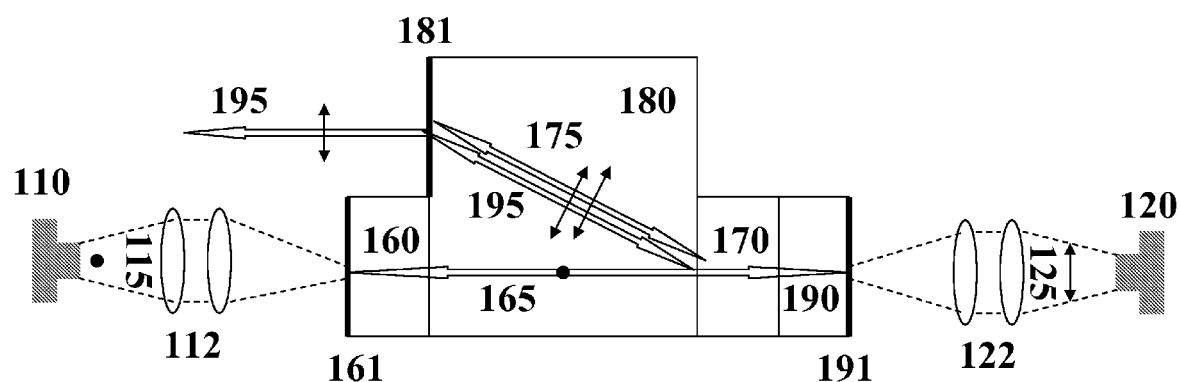
FIG. 1B shows an alternative scheme for efficient and low-noise intracavity beam combining and frequency mixing in a monolithic structure.

FIG. 1B shows an alternative embodiment, wherein two gain media 160 and 170 are placed on opposite sides of the birefringent crystal 180 and are respectively activated by pump lights 115 and 125, one of which is emitted from laser diode 110 and the other is emitted from the laser diode 120. The nonlinear optical crystal 190 is optically bonded onto another side of the gain medium 170. In order to avoid possible cross-talking, the gain media 160 and 170 are preferably different materials and have no overlapped emission spectra. Compared with the configuration shown in FIG. 1A, this configuration appears more compact under certain circumstances.

As will become clearer from further descriptions hereinafter, our invention can be embodied and configured in a variety of ways according to different applications. With this flexibility, many advantages of the present invention can be demonstrated.

Figure 2A:
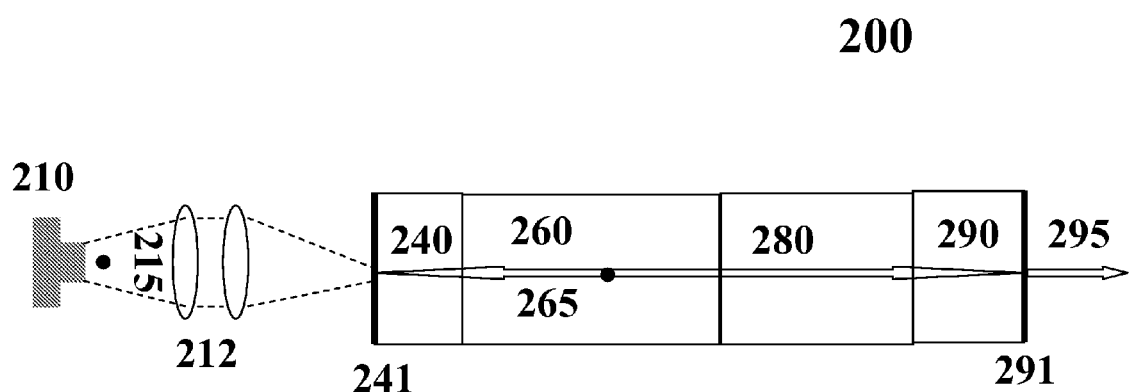
FIG. 2A shows a preferred embodiment for low-noise and efficient frequency doubling or optical parametric generation in a monolithic structure.

FIG. 2A shows a compact laser system, constructed in accordance with our inventive teachings. The monolithic microchip laser 200 is composed of a gain medium 260, a birefringent crystal 280, a nonlinear optical crystal 290, an optional Q-switch element 240, a beam shaping element 212, and a laser diode or other light source 210, which emits a pump light 215. Activated by the pump light 215, the gain medium 260 produces stimulated emission, resulting in the fundamental laser beam 265 in the resonant cavity composed of the mirrors 241 and 291. The mirror 241 is AR to the pump wavelength, HR to the fundamental wavelength 265 and the converted wavelength 295. On the other side, the mirror 291 is HR to 265 and HT to 295. Advantageously, the cross-section of the stimulated emission from the gain medium 260 can be polarization dependent or polarization independent. Due to the birefringence of the crystal 280, the extraordinary (e) component, if any, will be deviated away from the resonant cavity, lasing can only be established for the ordinary (o) component. The ordinarily polarized laser beam 265 enters the NLO crystal 290 for a nonlinear process, which can be harmonic generation for up-conversion or optical parametric oscillation (OPO) for down-conversion. For OPO that satisfies type II phase matching, the birefringent crystal 280 plays an additional role: realization of singly resonant OPO in a simple, cost-effective, and compact structure. This is achieved through the walk-off effect in the birefringent crystal 280. Because of this effect, the e-beam reflected from the mirror 291 is deviated away from the cavity, which eliminates possible interference between the signal and the idler and, consequently, reduces optical noise. The optional Q-switch element 240 can be passive or active, depending on the needs.

An important application of this configuration is generation of green or blue light. For the sake of explanation, consider a system, in which Nd:YAG is used as the gain medium 260, YVO$_4$ or TiO$_2$ is used as the birefringent crystal 280, and BBO or the like is used as the nonlinear optical crystal 290 for o+o$\Rightarrow$e SHG. Upon excitation by the pump light 215, the gain medium 260 emits laser at 1064 nm, which is then frequency-doubled in 290, resulting in CW green light at 532 nm. By adjusting the reflectance and transmittance of the mirrors 241 and 291, it is possible to achieve fundamental lasing at 946 nm or 1319 nm. After frequency doubling, one obtains blue light at 473 nm or red light at 659 nm.

Another important application of this configuration is eye-safe laser transmitters. An exemplary system comprises a Nd:YVO$_4$ crystal as the gain medium 260, a KTP crystal or the like served as 290 for singly resonant OPO at the signal wavelength around 1.55 μm, an undoped-YVO$_4$ or TiO$_2$ crystal as 280 for introducing e-beam walk-off to suppress any resonance at the idler wavelength, and an optional Cr:YAG to provide passive Q-switching. With this configuration, eye-safe laser pulses can be produced at high repetition rates.

Figure 2B:
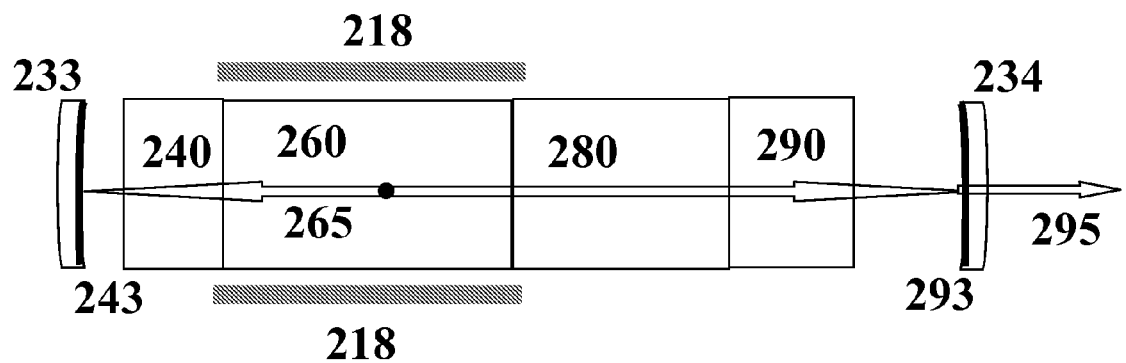
FIG. 2B shows an alternative embodiment for low-noise and efficient frequency doubling or optical parametric generation in a monolithic structure.

A variation of FIG. 2A is shown in FIG. 2B. The laser 201 has a hybrid structure. A pump assembly 218 composed of light sources such as LED (light emitting device) arrays or VCSEL (vertical cavity surfaces emitting laser) arrays, depending on the absorption spectrum of the gain medium, and a diffusion chamber is to provide optical energy for activation of the gain medium 260. Detailed structures of the LED or VSCEL array pump assemblies and a variety of alternative embodiments are described in U.S. Patent Publication No. 20050201442 and U.S. patent application Ser. No. 11414492. Two concave mirrors 233 and 234 form the resonant cavity. The coating 243 is HR to the fundamental wavelength 265 and the laser output wavelength 295, while the coating 293 is HR to 265 and HT to 295. This configuration is particularly useful for high-energy/power laser output. Possible applications include eye-safe long-distance laser rangefinders and blue/green lasers for undersea communications.

Tunability is a fundamental characteristic of all parametric devices. Therefore, with the aid of a mechanism for change of the phase matching conditions, the configurations demonstrated in FIGS. 2A and 2B enable achievement of wavelengths tunable over a range. Phase matching conditions can be changed by making use of the angular dependence of the birefringent of anisotropic crystal, or by temperature variation, or by electro-optic variation of the refractive indices.

Figure 3:
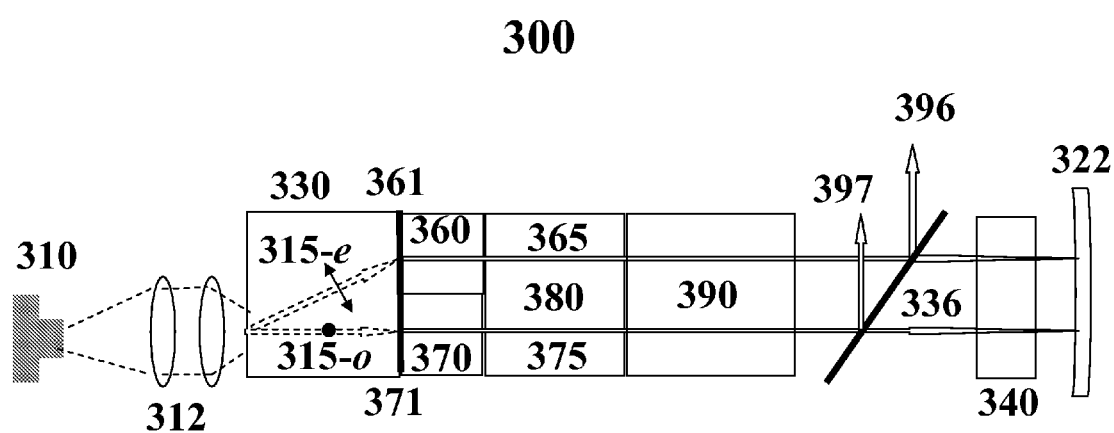
FIG. 3 shows a preferred embodiment for dual-pulse Q-switched laser with efficient frequency conversion.

Our inventive teachings can be implemented in many different ways for various applications. A dual-pulse Q-switched laser with efficient frequency conversion is schematically illustrated in FIG. 3. The laser system 300 comprises a pump assembly, two gain media 360 and 370, a birefringent crystal 380, a nonlinear optical crystal 390, an electro-optical Q-switch element 340 for dual-pulse control, a flat mirror 336, and a concave mirror 322. The pump assembly is composed of a light source such as laser diode 310, a beam shaping element 312, and a birefringent crystal 330 for splitting the pump beam into two components: 315-e and 315-o. The pump beam 315-e activates the gain medium 360 to produce the first fundamental laser beam 365. The pump beam 315-o activates the gain medium 370 to produce the second fundamental laser beam 375. The gain media 360 and 370 can be the same material or different, the stimulated emissions can be polarization dependent or independent. In the birefringent crystal 380, the fundamental laser beams 365 and 375 both have ordinary (o) polarization. Lasing at extraordinary (e) polarization will be suppressed. In some applications, the birefringent crystal 380 may be removed. In the nonlinear optical crystal 390, the frequencies of beam 365 and 375 are respectively converted via resonant SHG or OPO. The coating 361 is AR to the pump beam 315-e, HR to the first fundamental wavelength 365 and the first converted wavelength 396. The mirror 371 is AR to the pump beam 315-o, HR to the second fundamental wavelength 375 and the second converted wavelength 397. The concave mirror 322 is HR to 365, 375, 396, and 397. The flat mirror 336 is HT to the wavelengths of 365 and 375, while HR to the laser output beams 396 and 397 with the converted frequencies. The Q-switch element 340 alternatively controls the quality factors of the 361-322 and 371-322 cavities and produces pulses from the two channels in sequence. In time-of-flight (TOF) applications, where the time difference between the laser pulses sent to and reflected back from the target is measured, the first shot is for triggering and the second shot is for detection.

Many important wavelengths can be achieved from various configurations constructed according to our inventive teachings. For example, one or both fundamental beam(s) can be produced from laser diodes or other light sources rather than from internal gain medium (or media). Furthermore, one or more additional nonlinear optical processes such as harmonic generation, frequency mixing, and optical parametric generation can be introduced to achieve the desired wavelengths. With this flexibility, the available wavelength range can be further extended. Moreover, specially designed features incorporated into these sources such as wavelength coverage, RF modulation, direct modulation, broadband spectrum, and tunability can be carried into the frequency-converted output.

Figure 4A:
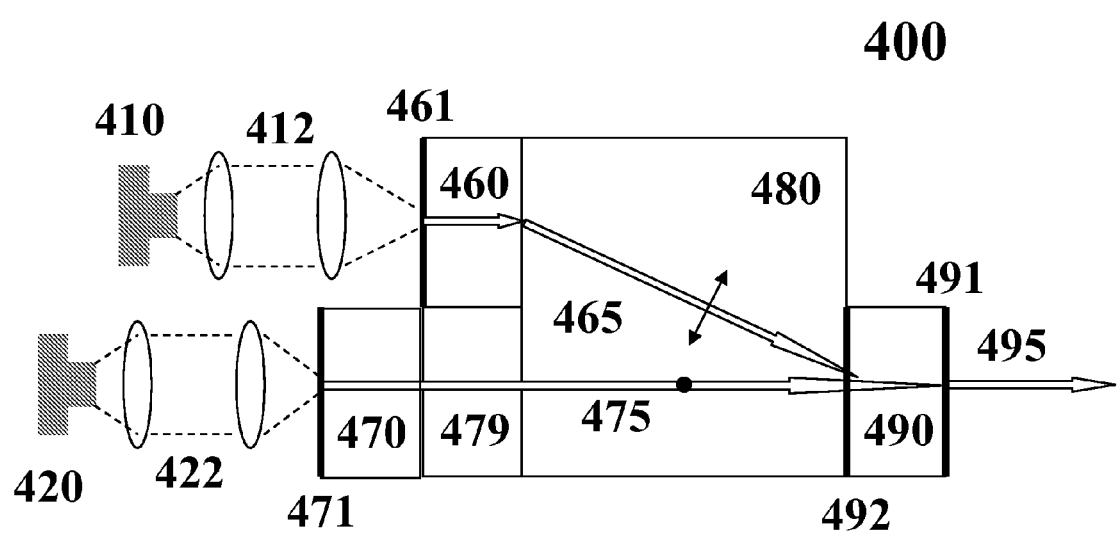
FIG. 4A shows a preferred embodiment of the inventive monolithic microchip laser, in which one fundamental laser beam is generated from a laser diode.

One variation of the inventive device is schematically shown in FIG. 4A, wherein the laser system 400 is composed of two gain media 460 and 470, two nonlinear optical crystals 490 and 479, a birefringent crystal 480, and optical pump assemblies. The first fundamental laser beam 465 is generated by the first gain medium 460 in the first resonant cavity between the mirrors 461 and 491. The second fundamental laser beam 475 is generated by the second gain medium 470 in the second resonant cavity between the mirrors 471 and 491 and the frequency is subsequently converted in the nonlinear optical crystal 479. Through the walk-off effect in birefringent crystal 480, the two fundamental beams are combined and frequency mixed in the nonlinear crystal 490.

Figure 4B:
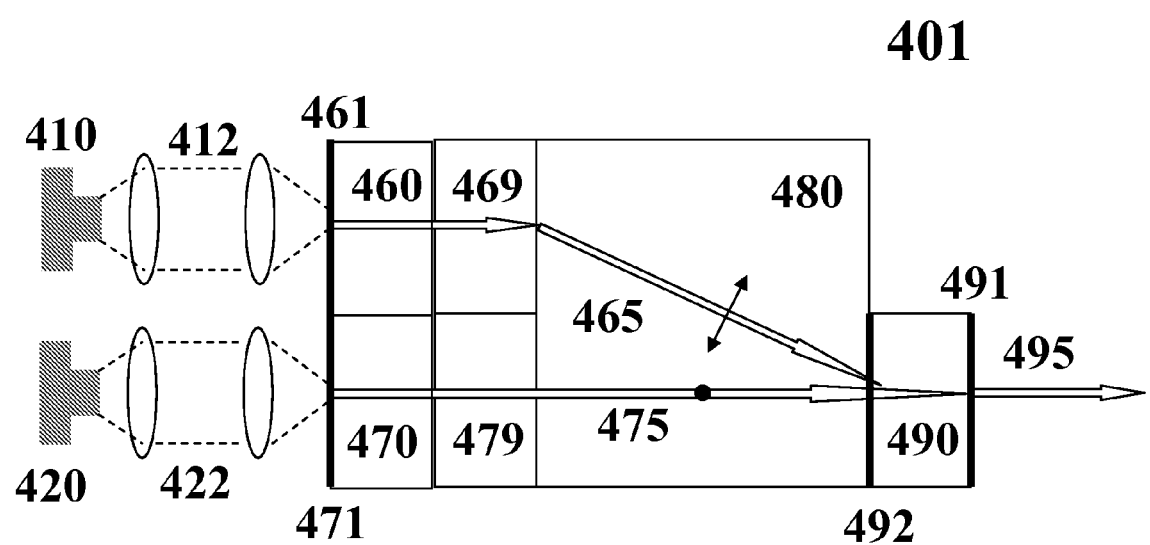
FIG. 4B shows a preferred embodiment of the inventive monolithic microchip laser, in which one fundamental laser beam is generated from an optical parametric oscillator.

Similarly, frequency conversion can also be applied to the first fundamental laser beam. As shown in FIG. 4B, an additional nonlinear optical process, which can be harmonic generation or optical parametric oscillation, takes place in the nonlinear optical crystal 469. The two frequency-converted laser beams 465 and 475 are combined due to the walk-off effect in 480 and frequency mixed in the nonlinear optical crystal 490. Depending on the selected transition lines in the gain media and the nonlinear optical processes experienced, the laser output 495 can be visible, IR, or UV.

For explanation, consider a system, in which the birefringent crystal 480 is un-doped YVO$_4$ or TiO$_2$, the gain media 460 and 470 are Nd:YVO$_4$, the nonlinear optical crystals 469 and 479 are for intracavity SHG, and the nonlinear optical crystal 490 is for SFM. In the gain medium 460, the laser transition at 1064 nm is supported by the resonant cavity between the mirrors 461 and 491. In the gain medium 470, the laser transition at 914 nm is supported by the resonant cavity between the mirrors 471 and 491. In the nonlinear optical crystal 490, the incoming laser beam 465 has the wavelength of 532 nm and the incoming beam 475 has the wavelength of 457 nm. After SFM, the laser output 495 has the wavelength of 246 nm. One advantage of this configuration stems from excellent transparency of un-doped YVO$_4$ and TiO$_2$ at wavelengths from 457 nm to 1064 nm. Another advantage is that the nonlinear optical processes are resonant, which further improves the efficiency. Due to their relatively high laser-induced damage threshold and broad transparency range, nonlinear crystals with B—O bonds are often employed for stable and high-power UV radiation.

A particularly important application of the present invention is to generate coherent UV radiation. Most potential applications of UV laser sources require time stability, good spatial and spectral quality, and output powers in the milliwatt range. Up to date, these requirements were not fully satisfied by existing UV sources.

A variety of compact and efficient configurations capable of producing UV lights can be derived based on our inventive teachings.

Figure 5A:
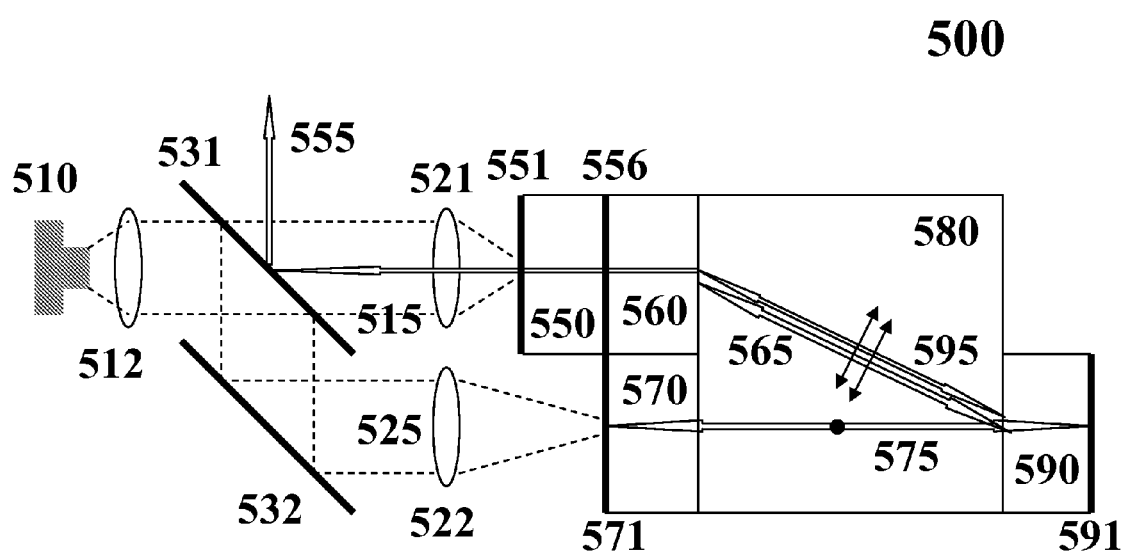
FIG. 5A shows a preferred embodiment of the inventive monolithic microchip laser that generates radiation of desired wavelength including UV.

A preferred embodiment of the inventive monolithic microchip laser that generates desired wavelengths including UV is schematically shown in FIG. 5A, wherein the two gain media 560 and 570 are optically bonded onto the left side of the birefringent crystal 580. These two gain media are respectively energized by the pump beams 515 and 525 to establish population inversion and produce stimulated emission. In this FIG. 5A, the pump beams 515 and 525 are emitted from the laser diode 510 and split by a pair of polarization-sensitive plates 531 and 532. However, the pump beams can also be split by other means and/or emitted from other light sources.

Emitted from the gain medium 560 and oscillated in the first resonant cavity formed between the mirrors 556 and 591, the beam 565 has the first fundamental wavelength $\lambda_1$ and is an e-ray in 580. On the other hand, the beam 575, emitted from the gain medium 570 and oscillated in the second resonant cavity formed between the mirrors 571 and 591, has the second fundamental wavelength $\lambda_2$ and is an o-ray in the birefringent crystal 580. Due to the walk-off effect, these two fundamental beams are combined in the nonlinear optical crystal 590 for sum frequency mixing. For phase matching type II in negative crystal 590, the mixed wave 595 is an e-ray in the birefringent crystal 580. Its propagation direction is tilted by the walk-off angle. Second harmonic of 595 is generated in the nonlinear optical crystal 550. The frequency-doubled beam 555, having a wavelength of $\lambda_f = \lambda_m/2 = \lambda_1\lambda_2/2(\lambda_1+\lambda_2)$, is extracted through the window 551, which is HT to $\lambda_f$, HR to $\lambda_m$, and AR to the pump beam 515. The propagation direction of 555 is changed by reflecting from the dichroically coated mirror 531. Other mirrors or films in this configuration are so coated that: 556 is AR to 515, HT to 595, HR to 565 and 555; 571 is AR to 525 and HR to 575; 591 is HR to 565, 575, and 595.

For a monolithic microchip laser, composed of an undoped yttrium vanadate or rutile as the birefringent crystal 580 and two neodymium-doped yttrium vanadate crystals as the gain media 560 and 570 for emitting fundamental laser beams 565 and 575, both at 1064 nm, the laser output 555 has a wavelength of $\lambda_f = 266$ nm.

By coating 551 HR to $\lambda_f$ and 556 HT to $\lambda_f$, the frequency-doubled beam 555, as an o-ray, will propagate through the birefringent crystal 580 and exit through the output coupler 581. With this configuration, which is conceptually illustrated in FIG. 5B, frequency doubling is resonant and the efficiency is improved. The limitation is possible absorption of 555 in 580.

Figure 5B:
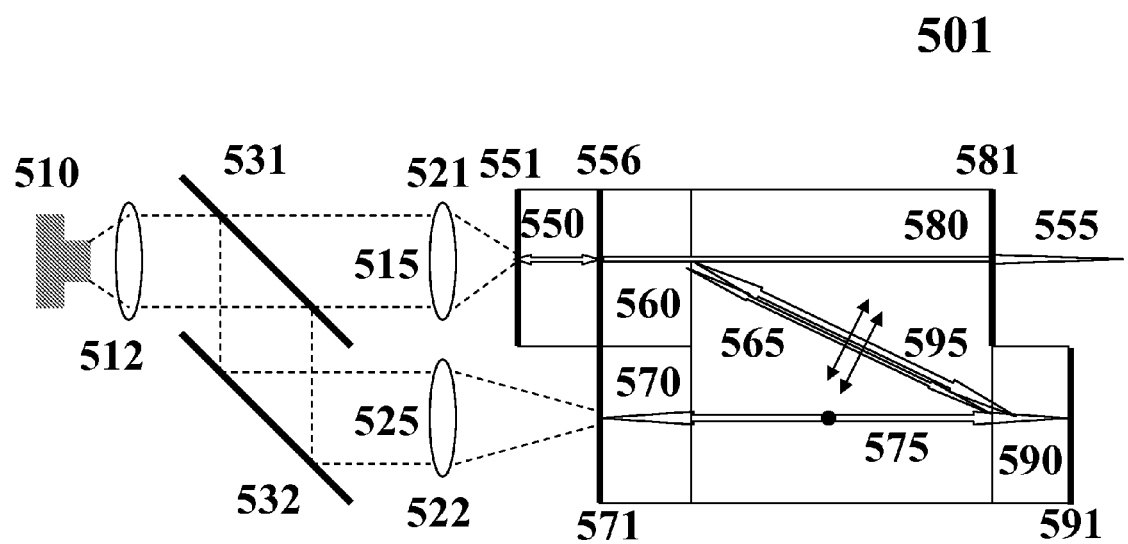
FIG. 5B shows an alternative embodiment of the inventive monolithic microchip laser that generates radiation of desired wavelength including UV.

Provided that the coating 556 in FIGS. 5A and 5B is HT to $\lambda_1$, but 551 is HR to $\lambda_1$ and $\lambda_m$, and the phase matching condition for SFM of 565 and 595 in the nonlinear optical crystal 550 is satisfied, a new wavelength $\lambda_t = \lambda_m\lambda_1/(\lambda_m+\lambda_1)$ is thereby possessed by 555. Accordingly, the output coupler, which is 551 in FIG. 5A and 581 in FIG. 5B, is HT to $\lambda_t$.

For a monolithic microchip laser containing two neodymium-doped yttrium vanadate crystals as the gain media 560 and 570 for emitting fundamental laser beams, both at 1064 nm, the laser output 555 now has a wavelength of $\lambda_t = 355$ nm. An undoped yttrium vanadate or rutile can be used as the birefringent crystal 580 in FIG. 5A. For the configuration displayed in FIG. 5B, a birefringent crystal with low absorption at $\lambda_t$ should be selected for minimizing intracavity loss.

Figure 5C:
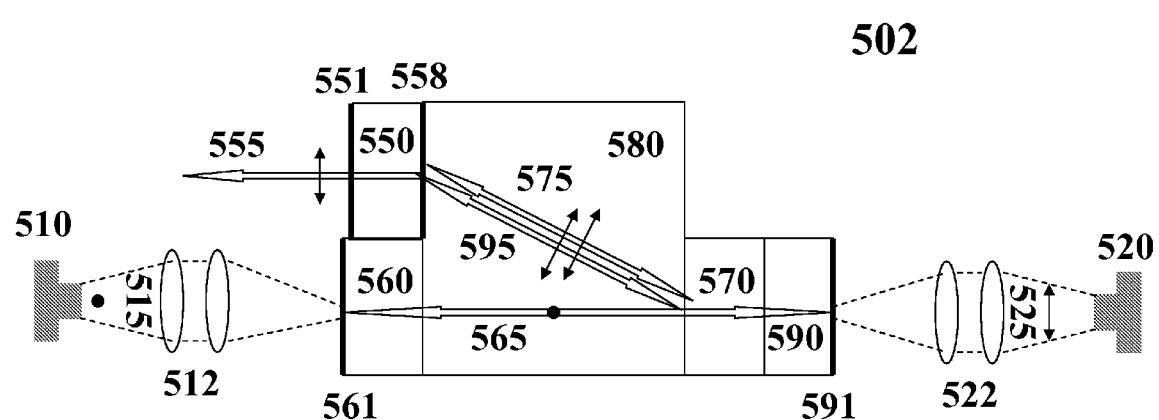
FIG. 5C shows another alternative embodiment of the inventive monolithic microchip laser that generates radiation of desired wavelength including UV.

An alternative configuration, which is schematically shown in FIG. 5C, is actually a variation of FIG. 1B by adding a second nonlinear optical crystal 550 optically bonded onto the birefringent crystal 580 at the same side as that of the gain medium 560. Activated by the pump beam 515, the gain media 560 emits the light 565 at the first fundamental wavelength $\lambda_1$. Similarly, the gain medium 570 emits the light 575 at the second fundamental wavelength $\lambda_2$. Upon interaction with the optically nonlinear crystal 590, these two incoming waves produce a new wave 595 at the sum frequency $\lambda_m$. For phase matching type II in negative crystal 590, the mixed wave 595 is an e-ray in the birefringent crystal 580. Due to the walk-off effect, the propagation direction of 595 tilts upwards. Due to second harmonic generation of 595 in the nonlinear optical crystal 550, the UV light 555 at the doubled frequency $\lambda_f = \lambda_m/2 = \lambda_1\lambda_2/2(\lambda_1+\lambda_2)$ is produced. The coating 558 at the interface between 550 and 580 and the coating 591 on the exterior surface of 590, both are HR to the second fundamental wavelength $\lambda_2$, form the resonant cavity of the second fundamental laser beam 575. A dielectric mirror 551 is coated onto the external surface of the nonlinear optical crystal 550 to provide HR for the sum frequency $\lambda_m$ and HT for the VU light $\lambda_f$.

Figure 5D:
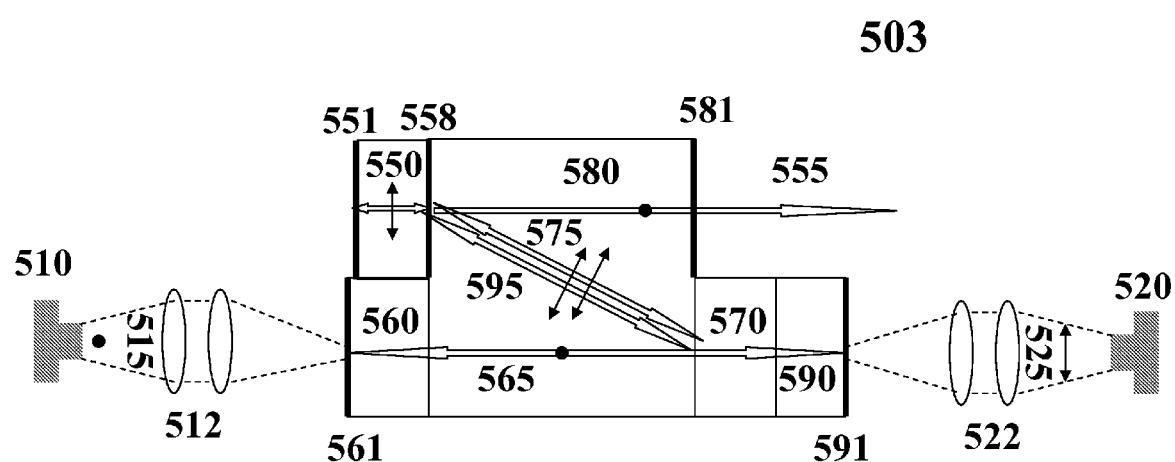
FIG. 5D shows another alternative embodiment of the inventive monolithic microchip laser that generates radiation of desired wavelength including UV.

Alternatively and as shown in FIG. 5D, the beam 555, which is an o-ray in the birefringent crystal 580, can be extracted through the output coupler 581. This can be realized by coating 551 HR to $\lambda_f$ and 556 HT to $\lambda_f$. With this configuration, frequency doubling in 550 is resonant and the efficiency is improved. The limitation is possible absorption of 555 in 580.

As can be appreciated by those skilled in the art, the nonlinear optical process in 550 can be SFM of the beams 575 and 595. With appropriate coatings of 551 and 558, a new wavelength $\lambda_t = \lambda_m\lambda_2/(\lambda_m+\lambda_2)$ can be generated.

Figure 5E:
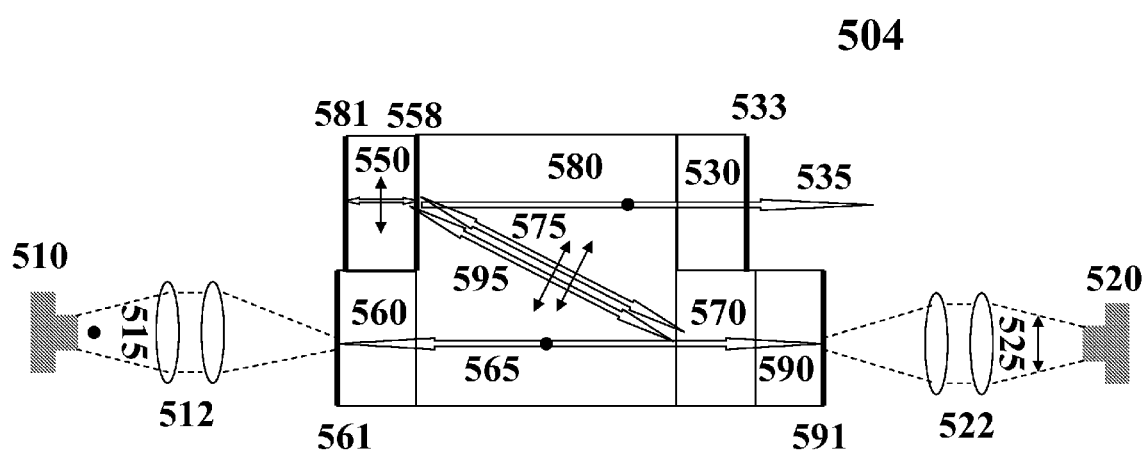
FIG. 5E shows another alternative embodiment of the inventive monolithic microchip laser that generates radiation of desired wavelength including UV.

Further variation can be made. For example and with reference to FIG. 5E, a third nonlinear optical crystal 530 is optically bonded onto another surface of the birefringent crystal 580 in the configuration of FIG. 5D for another nonlinear process, which can be SHG or OPO. The frequency-converted laser beam 535 is extracted through the output coupler 533. If the nonlinear optical crystals 550 and 530 are both for SHG, the laser output 535 has the wavelength of $\lambda_s = \lambda_m/4 = \lambda_1\lambda_2/4(\lambda_1+\lambda_2)$. Provided that the nonlinear optical crystal 550 is for SFM while 530 is for SHG, the laser output 535 has the wavelength of $\lambda_v = \lambda_t/2 = \lambda_m\lambda_2/2(\lambda_m+\lambda_2)$.

Figure 5F:
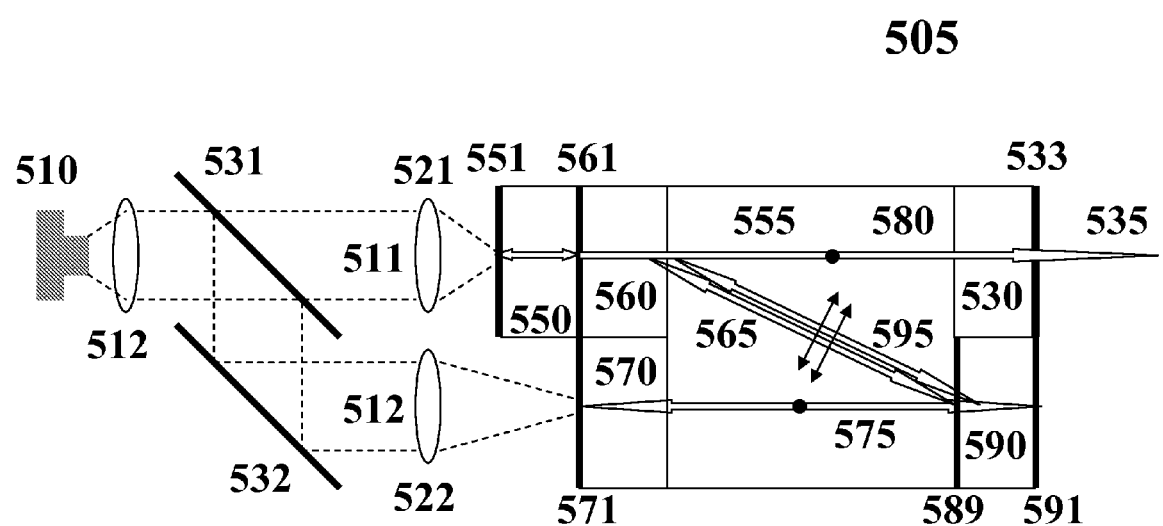
FIG. 5F shows another alternative embodiment of the inventive monolithic microchip laser that generates radiation of desired wavelength including UV.

Similarly, a third nonlinear optical crystal 530 can be introduced into the configuration shown in FIG. 5B for an additional nonlinear process, which can be SHG or OPO. As illustrated in FIG. 5F, the o-ray 555 propagates through the birefringent crystal 580 and enters into the nonlinear optical crystal 530, in which a third nonlinear process takes place. If the nonlinear optical crystals 550 and 530 are both for SHG, the laser output 535 has the wavelength of $\lambda_s = \lambda_m/4 = \lambda_1\lambda_2/4$ ($\lambda_1+\lambda_2$). In case the nonlinear optical crystal 550 is for SFM while 530 is for SHG, the laser output 535 has the wavelength of $\lambda_v=\lambda_v/2=\lambda_m\lambda_2/2(\lambda_m+\lambda_2)$.

It should be understood that the configurations demonstrated in FIGS. 5A-5F are examples and are for explanation only. As can be appreciated by those skilled in the art, there are many other alternative configurations constructed according to our inventive teachings for generation of UV or DUV lights. It should also be pointed out that the nonlinear optical processes in FIGS. 5A-5F are not restricted to SFM and/or SHG, other processes such as DFM and/or OPO that fulfill required phase-matching conditions can be applied according to the needs. Selection of lasing lines, nonlinear optical processes, and coating properties are a matter of design engineering. With sophisticated selection of fundamental wavelengths, frequency-conversion processes, and other parameters, a variety of useful wavelengths covering a broad range from IR to UV can be generated in a compact, efficient, and cost-effective manner.

Figure 6A:
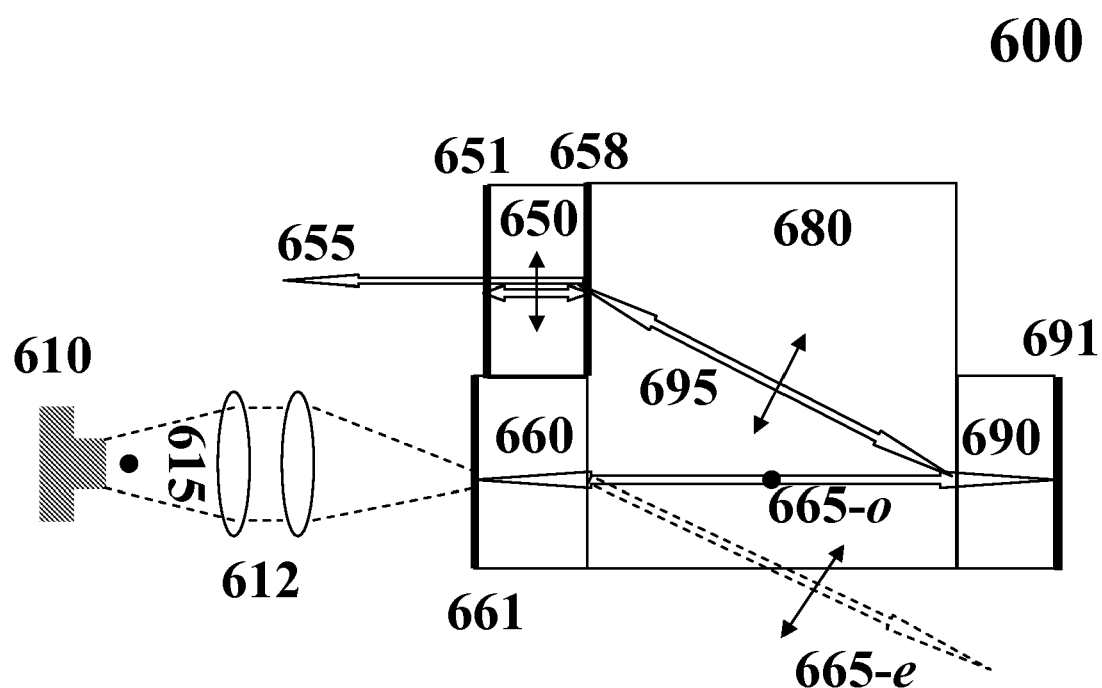
FIG. 6A shows an inventive configuration for generation of desired wavelength including UV from a single-gain-medium monolithic microchip laser system.

Without departure from the principles of our inventive teachings, UV radiation can be efficiently achieved in even more compact structures. An exemplary system is hereby schematically illustrated in FIG. 6A. The monolithic microchip laser 600 is composed of a gain medium 660, a birefringent crystal 680, two nonlinear optical crystals 650 and 690, and a pump source together with a set of optical elements for beam shaping. In this graph, the pump light 615 is produced by a laser diode 610. However, other light sources, which spectrally and spatially match the gain medium, can be used. The stimulated emission of the gain medium 660 can be polarization dependent or polarization independent. Only the ordinarily-polarized emission 665-o can be circulated in the resonant cavity to form the laser beam. For o+o⇒e phase matching condition, the frequency doubled beam 695, as an e-ray, rotates the propagation direction by the walk-off angle and injects into the second nonlinear optical 650 for another SHG. With quadruplicated frequency, the laser beam 655 is extracted through the output coupler 651. In this configuration, the mirror 661 is AR to the pump light 615 and HR to the fundamental wavelength 665-o; the mirror 691 is HR to 665-o and 695; the mirror 651 is HR to 695 and HT to 655; while the interfacial coating 658 between the nonlinear optical crystal 650 and the birefringent crystal 680 is HT to 695 and HR to 655.

If the gain medium 660 is Nd:YAG, which emits laser at the fundamental wavelength 1064 nm, the laser output 655 is UV at 266 nm.

Figure 6B:
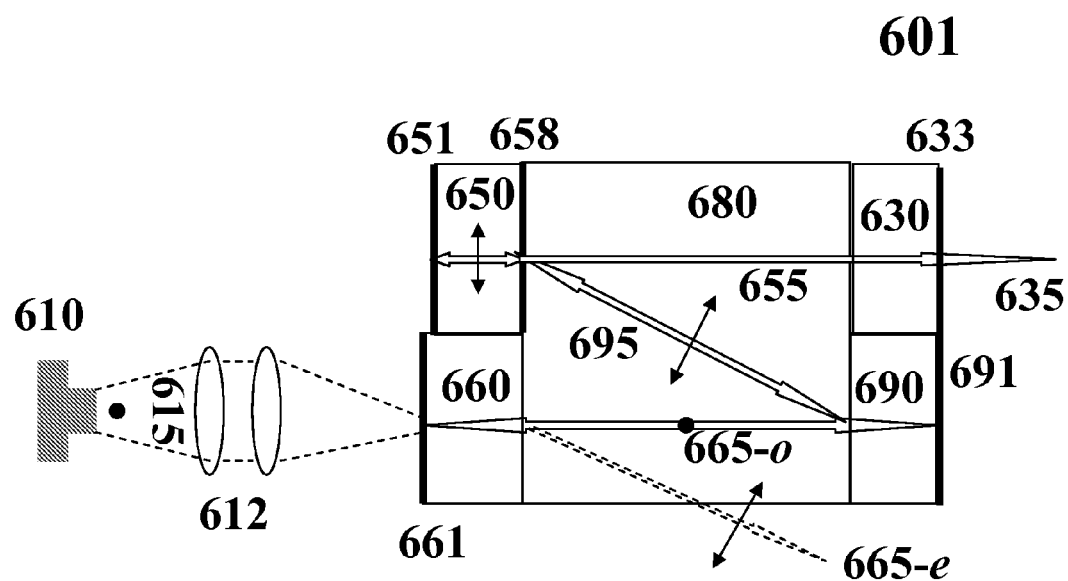
FIG. 6B shows another inventive configuration for generation of desired wavelength including UV from a single-gain-medium monolithic microchip laser system.

As can be appreciated by those skilled in the art, a third SHG can be introduced for eighth-harmonic generation (EHG). Referring to FIG. 6B, in which an additional nonlinear optical crystal 630 is optically bonded onto the birefringent crystal 680. Accordingly, the mirror 651 is now HR to both 695 and 655, and the interfacial coating 658 is HT to both 695 and 655. With this configuration, efficient EHG can be realized. However, the shortest wavelength that can be achieved is determined by the absorption characteristics of the birefringent crystal 680.

According to the present invention, low-noise lasers are achieved not only by means of elimination of the "green problem" but also by means of speckle reduction. Speckle is a serious problem in UV applications such as photolighography and inspection systems where even illumination is critical. Speckle noise is an interference pattern created by a slight difference in path traveled by photons making up the laser beam. Speckle may be a result of reflection of highly coherent (both spatial and temporal) light from slightly turbulent air or optically rough surfaces (RMS surface height deviations on the same order or scale as the wavelength of the light beams) and can be reduced by superimposing a number of uncorrelated speckle patterns, obtained by diversity of time, space, frequency, or polarization. Past efforts of reducing speckle noise are mostly based on wavelength (frequency) diversity. Independent (uncorrelated and non-interfering) speckle patterns are created due to disturbance of the phase coherency between the interfering waves and speckle noise is reduced by time averaging of these patterns.

Speckle reduction is particularly challenging for UV lasers. One approach to speckle reduction is based on interposing dispersing elements in the light path. An example of such systems was demonstrated by Kleinschmidt in U.S. Pat. No. 6,898,216, in which a phase retardant plate bearing periodic optically-coated regions or a scattering plate bearing a roughened surface was used for disturbance of spatial coherence. As another example, in U.S. patent application Ser. No. 20050128473, Karpol et al. described a pulsed laser system employing two fiber bundles for breaking coherence. These methods are unfortunately complicated and cause significant power losses.

The present invention enables speckle reduction in an efficient and cost-effective manner. According to our inventive teachings, the two fundamental beams are formed in two independent cavities with different optical lengths. In multimode operations, the longitudinal modes of the first and second fundamental beams are inherently spaced unequally. Mode degeneration does not exist during the sum frequency mixing and subsequent nonlinear processes. Consequently, the number of longitudinal modes in laser output is multiplied and the mode spacing is narrowed from the input spectra. This greatly reduces speckle noise. In addition, since the output spectrum always consists of unevenly spaced modes, risks associated with self mode locking or Q-switching can be eliminated.

What is claimed is:

1. A monolithic microchip laser comprising:
   a first gain medium longitudinally pumped by a first laser beam from one end to produce a first fundamental wave linearly polarized;
   a second gain medium longitudinally pumped by a second laser beam from one end to produce a second fundamental wave linearly polarized along a direction orthogonal to the polarization of the first fundamental wave;
   a birefringent crystal, called beam-combining birefringent crystal, in which one of the fundamental waves is an e-ray and the other wave is an o-ray; and
   at least two nonlinear optical crystals for frequency conversion;
   wherein the birefringent crystal is sandwiched in between the gain media and the nonlinear optical crystals, all these crystals are optically bonded each other to form a monolithic structure, at least one nonlinear optical crystal is disposed at each side of the beam-combining birefringent crystal, at least one nonlinear optical crystal is optically bonded to the birefringent crystal, at least one nonlinear optical crystal is optically bonded to the gain medium;
   wherein frequency mixing takes place in one or more nonlinear optical crystal(s) optically bonded to the birefringent crystal;
   wherein the two fundamental waves are generated in two separate cavities, the resonant cavity that supports laser oscillation polarized normal to the principal plane of the birefringent crystal is linear while the resonant cavity that supports laser oscillation with polarization in the principal plane of the birefringent crystal is bent at each end faces of the birefringent crystal by an angle equivalent to the walk-off angle, the only common portion of the two cavities is the nonlinear optical crystal wherein frequency mixing of the first and the second fundamental waves take place;

wherein the two pump beams are parallel to each other and are separated by a distance equal to the length of the beam-combining birefringent crystal multiplied by the tangent walk-off angle;

wherein the pump beams are optically coupled to their corresponding gain media through any one of the followings:
- a direct coupling at close distance,
- a set of beam shaping lenses,
- a micro-integrated lens array.

2. A monolithic microchip laser as of claim 1, wherein:

the two gain media are reduced to an isotropic crystal, in which two separated regions are simultaneously activated by two pump beams parallel to each other.

3. A monolithic microchip laser as of claim 1 further comprising:

a beam-displacement birefringent crystal that is optically bonded onto the monolithic microchip laser;

wherein the two pump beams are split from one beam emitted from a single light source via walk-off of the extraordinary component in the beam-displacement birefringent crystal;

wherein the light source is so oriented that the split pump beams produce substantially equal intensities of the fundamental waves.

4. A monolithic microchip laser comprising:

a first gain medium longitudinally pumped by a first laser beam from one end to produce a first fundamental wave linearly polarized;

a second gain medium longitudinally pumped by a second laser beam from one end to produce a second fundamental wave linearly polarized along a direction orthogonal to the polarization of the first fundamental wave;

a birefringent crystal, in which one of the fundamental waves is an e-ray and the other wave is an o-ray; and at least two nonlinear optical crystals for frequency conversion;

wherein all these crystals are optically bonded each other to form a monolithic structure;

wherein the two gain media are disposed at the two opposite sides of the birefringent crystal;

wherein at least one nonlinear optical crystal is disposed at each side of the birefringent crystal, at least one nonlinear optical crystal is optically bonded to the birefringent crystal, at least one nonlinear optical crystal is optically bonded to a gain medium;

wherein the two fundamental waves are generated in two separate cavities, the resonant cavity that supports laser oscillation polarized normal to the principal plane of the birefringent crystal is linear while the resonant cavity that supports laser oscillation with polarization in the principal plane of the birefringent crystal is bent at one or each end face of the birefringent crystal by an angle equivalent to the walk-off angle;

wherein frequency mixing of the first and the second fundamental wave takes place in one nonlinear optical crystal, which is a common portion of the two cavities;

wherein the two pump beams are in line propagating with opposite directions;

wherein the pump beams are optically coupled to their corresponding gain media through any one of the followings:
- a direct coupling at close distance,
- a set of beam shaping lenses,
- a micro-integrated lens array.

5. A monolithic microchip laser as of claim 1 or claim 4, wherein:

one or more nonlinear optical crystal(s) are for harmonic generation or optical parametric generation of fundamental wave(s).

* * * * *